United States Patent
Brettschneider et al.

(10) Patent No.: US 11,319,820 B2
(45) Date of Patent: May 3, 2022

(54) BLADE OR GUIDE VANE WITH RAISED AREAS

(71) Applicant: MTU Aero Engines AG, Munich (DE)

(72) Inventors: Markus Brettschneider, Karlsfeld (DE); Fadi Maatouk, Munich (DE)

(73) Assignee: MTU Aero Engines AG, Munich (DE)

( * ) Notice: Subject to any disclaimer, the term of this patent is extended or adjusted under 35 U.S.C. 154(b) by 900 days.

(21) Appl. No.: 15/628,764

(22) Filed: Jun. 21, 2017

(65) Prior Publication Data
US 2017/0370234 A1     Dec. 28, 2017

(30) Foreign Application Priority Data
Jun. 23, 2016   (DE) ...................... 10 2016 211 315.1

(51) Int. Cl.
*F01D 5/30*   (2006.01)
*F01D 5/14*   (2006.01)
*F01D 9/04*   (2006.01)

(52) U.S. Cl.
CPC .............. *F01D 5/30* (2013.01); *F01D 5/145* (2013.01); *F01D 9/041* (2013.01); *F05D 2220/323* (2013.01); *F05D 2240/123* (2013.01); *F05D 2240/124* (2013.01); *F05D 2240/305* (2013.01); *F05D 2240/306* (2013.01); *F05D 2250/711* (2013.01); *Y02T 50/60* (2013.01)

(58) Field of Classification Search
CPC . F01D 5/30; F01D 5/145; F01D 9/041; F05D 2240/123; F05D 2240/124; F05D 2240/305; F05D 2240/306; F05D 2220/323; F05D 2250/711; Y02T 50/673
See application file for complete search history.

(56) References Cited

U.S. PATENT DOCUMENTS 2,597,510 A  *  5/1952  McBride ................. F04D 29/68
                                                   416/231 R
8,177,499 B2 *  5/2012  Iida ........................ F01D 9/041
                                                    415/208.1
8,864,452 B2    10/2014 Tham et al.
(Continued)

FOREIGN PATENT DOCUMENTS

DE          10310150 B4    5/2005
DE       102015224376 A1   6/2017
(Continued)

*Primary Examiner* — Phutthiwat Wongwian
*Assistant Examiner* — Sherman D Manley
(74) *Attorney, Agent, or Firm* — Barlow, Josephs & Holmes, Ltd.; David R. Josephs

(57) ABSTRACT

The invention relates to a blade or vane, particularly of a turbine stage of a gas turbine, in particular of an aircraft gas turbine, having a blade or vane root and a blade or vane element joined to the blade or vane root, wherein the blade or vane element has a pressure side and a suction side, and wherein the blade or vane root has at least one raised region on its radial outer side facing the blade or vane element. It is proposed according to the invention that the blade or vane has a first raised region on the pressure side and a second raised region on the suction side, wherein the highest point of the first raised region is disposed essentially directly adjacent to the pressure side, and the highest point of the second raised region is disposed essentially directly adjacent to the suction side.

8 Claims, 1 Drawing Sheet

(56) References Cited

U.S. PATENT DOCUMENTS

Figure 1:
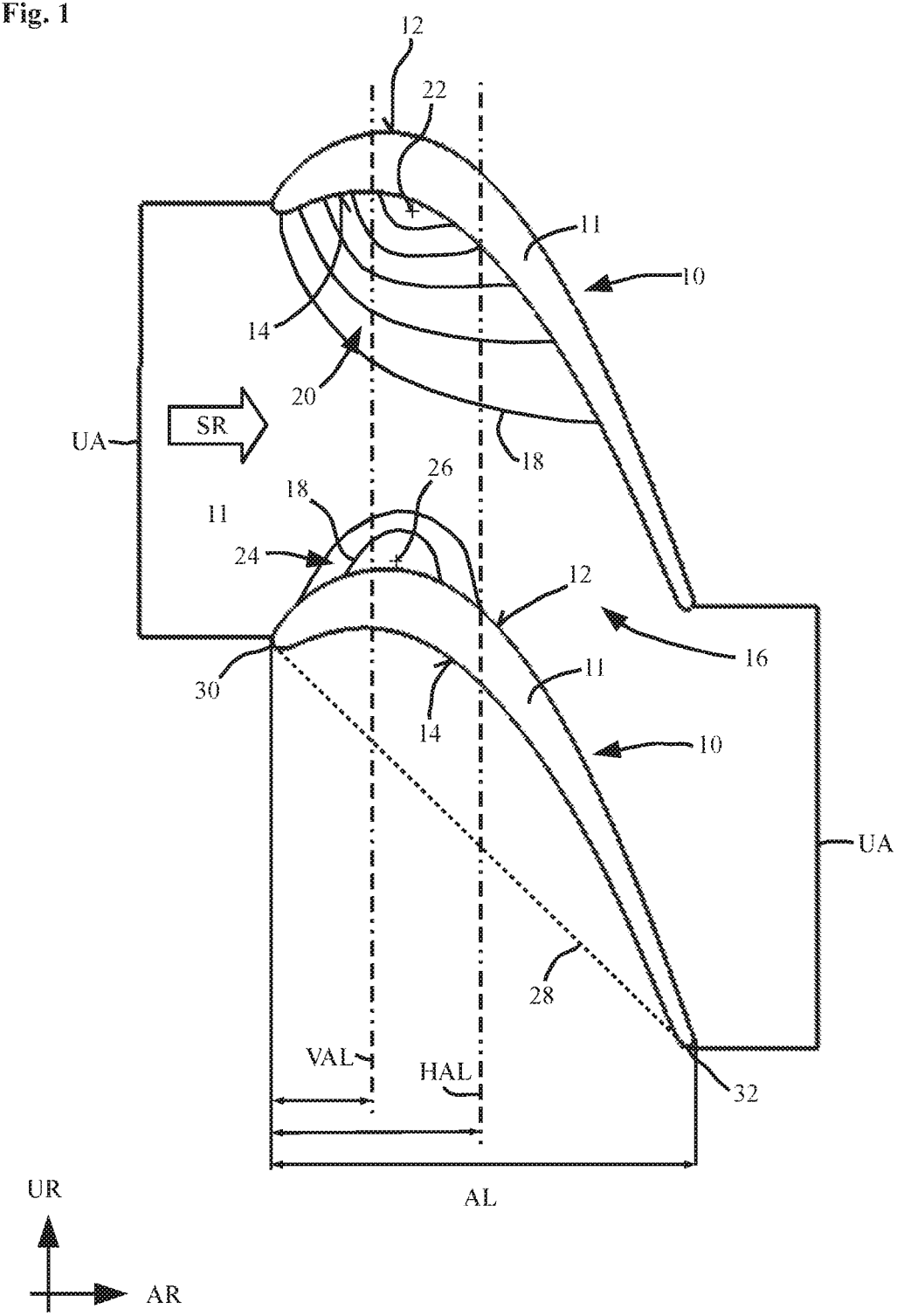

| | | | |
|---|---|---|---|
| 2007/0258810 A1* | 11/2007 | Aotsuka | F01D 5/143 415/206 |
| 2007/0258819 A1* | 11/2007 | Allen-Bradley | F01D 5/145 416/193 A |
| 2011/0014056 A1* | 1/2011 | Guimbard | F01D 5/143 416/223 A |
| 2011/0110788 A1* | 5/2011 | Guimbard | F01D 5/143 416/241 R |
| 2011/0189023 A1* | 8/2011 | Guimbard | F01D 5/143 416/223 R |
| 2012/0201688 A1* | 8/2012 | Mahle | F01D 5/143 416/235 |
| 2013/0224027 A1* | 8/2013 | Barr | F01D 5/143 416/193 A |
| 2013/0251520 A1* | 9/2013 | Barr | F01D 5/145 415/208.2 |
| 2014/0044551 A1* | 2/2014 | Mahle | F01D 5/143 416/223 R |
| 2014/0154079 A1* | 6/2014 | Chouhan | F01D 5/143 416/179 |
| 2014/0169977 A1* | 6/2014 | Brettschneider | F01D 5/143 416/223 A |
| 2015/0204196 A1* | 7/2015 | Miyoshi | F01D 5/143 60/772 |
| 2016/0273362 A1* | 9/2016 | Li | F01D 5/143 |
| 2017/0089203 A1* | 3/2017 | Lohaus | F01D 5/14 |
| 2017/0159444 A1* | 6/2017 | Wolfrum | B63H 21/00 |
| 2017/0218769 A1* | 8/2017 | Venugopal | F01D 5/145 |

FOREIGN PATENT DOCUMENTS

| | | |
|---|---|---|
| EP | 2136033 A1 | 12/2009 |
| EP | 2487329 A1 | 8/2012 |
| EP | 2650475 A1 | 10/2013 |
| EP | 2241723 B1 | 8/2014 |
| EP | 2787172 A2 | 10/2014 |
| EP | 2806103 A1 | 11/2014 |
| EP | 2692986 A1 | 10/2015 |
| EP | 3225781 A2 | 10/2017 |
| WO | 2014/099102 A1 | 6/2014 |
| WO | 2015/195112 A1 | 12/2015 |

\* cited by examiner

BLADE OR GUIDE VANE WITH RAISED AREAS

BACKGROUND OF THE INVENTION

The present invention relates to a blade or vane, particularly of a turbine stage of a gas turbine, in particular of an aircraft gas turbine, having a blade or vane root and a blade or vane element joined to the blade or vane root, wherein the blade or vane element has a pressure side and a suction side, and wherein the blade or vane root has at least one raised region on it radial outer side facing the blade or vane element.

Directional indications such as "axial" or "axially", "radial" or "radially", and "peripheral" are basically to be understood as referred to the machine axis of the gas turbine, as long as something different does not ensue explicitly or implicitly from the context.

In the region of rotating blade roots in the so-called annular channel, it is known to provide regions that are elevated or raised when compared to an ideal annular space geometry of cylindrical or conical shape, for example, i.e., regions that project into the annular channel, in order to positively influence the flow ratios in the annular channel.

SUMMARY OF THE INVENTION

The object of the invention is to further improve the flow ratios, in particular, so as to further avoid secondary flows, such as channel eddies.

In order to achieve this object, it is proposed that the vane or blade has a first raised region on the pressure side and a second raised region on the suction side, wherein the highest point of the first raised region is disposed essentially directly adjacent to the pressure side, and the highest point of the second raised region is disposed essentially directly adjacent to the suction side.

Expressed in another way, it can also be said that the highest point of the first raised region contacts the pressure side of the blade or vane element or is only slightly distanced from the latter, and that the highest point of the second raised region contacts the suction side of the blade or vane element or is only slightly distanced from it. In this case, "slightly" is to be understood such that the distance amounts to a maximum of 5%, preferably a maximum of 1% of a chord length, i.e., of a length between a leading edge and a trailing edge of the blade or vane element. The contacts between the two raised regions and the blade or vane element in this case can be limited not only to the respective highest point, but can extend over a contact region along the suction side or the pressure side.

By way of this specific arrangement of the raised regions that can also be called a contouring of the annular space, the static pressure field can be influenced at the side walls and at the blades or vanes in the edge region thereof, so that secondary flows can be reduced. Losses can be reduced thereby, and the inflow onto a blade or vane cascade lying downstream can be improved.

The highest point of the first raised region and the highest point of the second raised region can lie in the direction of flow in a front or leading one-half of an axial distance, wherein the axial distance is a projection of a chord that joins a leading edge region and a trailing edge region of the blade or vane element.

In this case, the highest point of the second raised region can lie in a front or leading first one-fourth of the axial distance.

Further, the highest point of the first raised region can lie in a second one-fourth of the axial distance.

The blade or vane can be designed as a rotating blade or as a guide vane.

Further, as another independent aspect of the invention, it is also conceivable to provide an analogous configuration of raised regions at a radially outer shroud, thus at a radially outer end of the blade or vane element, wherein the raised region can rise radially inward in such a case. Also, in the case of raised regions at the shroud, the latter can have the properties described above for the blade or vane.

The invention further also relates to a rotor having a rotor disk and having a plurality of the above-described blades arranged next to one another in the peripheral direction. In such a case, the blades or vanes are designed as rotating blades.

In the case of the rotor, the blades can be joined to the rotor disk in form-fitting manner by means of their blade root. The blade roots here can have an ordinary dovetail or fir-tree configuration and can be taken up in corresponding uptakes for the blade roots in the rotor disk.

Alternatively, in the case of the rotor, the blades and the rotor disk can be joined together integrally. The latter involves a so-called blisk (blade integrated disk), thus a disk having rotating blades formed integrally or in a materially-bonded manner. Alternatively, a so-called BLING (blade integrated ring) can also be used for the rotor according to the invention. In this case, a radial outer side of the rotor disk, which lies between two blades in the peripheral direction, forms the radial outer side of the blade root in the sense of the terminology used here. Thus, the raised regions are provided approximately at the radial outer side of the rotor disk.

Finally, the invention also relates to a gas turbine, in particular an aircraft gas turbine, having at least one rotor disk, as it has been described in the above alternatives.

BRIEF DESCRIPTION OF THE DRAWING FIGURES

The invention will be described below with reference to the attached figures by way of example and not in any limiting manner.

In a schematic, simplified illustration, FIG. 1 shows two adjacent blades that are designed as rotating blades, and an arrangement of raised regions on the suction side and on the pressure side.

DESCRIPTION OF THE INVENTION

In FIG. 1, two rotating blades 10 with their respective blade element 11 are visible, each of which has a suction side 12 and a pressure side 14. The two rotating blades 10 or blade elements 11 are disposed next to one another at a distance UA in the peripheral direction UR. In this case, the two rotating blades 10 can be joined together integrally in one piece via a common radially inner platform, for example, by way of a casting process; thus they can form a part of a rotating blade cluster; or alternatively, they can also be separated from one another by way of a gap in the radially inner platform, which is not shown in the schematic figure, and thus they can particularly be separately manufactured individual rotating blades. A flow channel 16 is formed between the two rotating blades 10, and the fluid, in particular hot gas of a gas turbine flows through this channel in the main flow direction SR which is essentially parallel to the axial direction AR. The rotating blades 10 are preferably disposed in an annular channel conveying hot gas of a turbine stage, particularly a low-pressure turbine stage, of a gas turbine.

Contour lines 18 are drawn schematically and in a simplified manner on the pressure side 14 for the rotating blade 10 that is shown at the top of the figure. These contour lines represent a first raised region 20. Proceeding from a base level, the so-called ideal annular space, the raised region 20 rises between the two rotating blades 10 up to the pressure side 14. The first raised region 20 has a highest point 22 which, in the case of the pressure side 14, is disposed, in particular essentially, directly adjacent to the pressure side 14. Expressed in another way, it can also be stated that the first raised region 20 transitions into the pressure side 14 or contacts the pressure side 14.

For the lower rotating blade 10, a blade chord 28 is shown by the dotted line, which conceptually joins a leading edge 30 and a trailing edge 32 of the rotating blade 10. The projection of this blade chord 28 onto the axial direction AR forms the axial length AL of the rotating blades 10, which can also be called the axial distance.

One-half of the axial length HAL and one-fourth of the axial length VAL are depicted qualitatively by two dot-dash lines HAL and VAL running in the peripheral direction UR. Expressed in another way, one can also state that VAL is equal to 0.25×AL and that HAL is equal to 0.5×AL.

As can be seen from the illustration, it is preferred that the highest points 22, 26 of the first raised region 20 and the second raised region 24, when referred to the direction of flow SR (or axial direction AR), are disposed in the front or leading half. The highest points 22, 26, when referred to the axial length AL, thus have a position that is equal to or less than 0.5×AL. The highest point 26 of the second raised region 24 can also lie in the first one-fourth of the axial length AL; thus, in particular, it can assume a position that is less than VAL, although this is not shown in the drawing. Advantageously, there are also combinations in which the highest point 22 of the first raised region 20 lies between VAL and HAL, and the highest point 26 of the second raised region 24 is less than VAL.

For the first raised region 20, the highest point 22 can lie, in particular, in the region between VAL and HAL. The position of the highest point 22 is thus equal to or less than HAL and greater than or equal to VAL. The second raised region 24 is disposed within the front or leading half of the suction side 12. Expressed in another way, the complete second raised region 24 extends maximally up to one-half of the axial length HAL.

Due to the raised regions 20, 24 presented here, which are dimensioned or disposed with respect to the axial length AL of the rotating blades 10, the static pressure field on the side walls and on the blades in the edge region can be influenced so that secondary flows (channel eddies) can be reduced. Flow losses can be reduced thereby and the inflow of fluid or hot gas to a downstream blade cascade can be improved.

Although the invention has been explained in the figures only with respect to a rotating blade, raised regions can also be provided in an analogous way to a guide vane. Further, it is also conceivable that a radially outer shroud has raised regions in an analogous way.

What is claimed is:

1. A blade or vane of an aircraft gas turbine, comprising:
a blade or vane root and a blade or vane element joined to the blade or vane root, wherein the blade or vane element has a pressure side and a suction side, and wherein the blade or vane root has at least one raised region on its radial outer side facing the blade or vane element, wherein
the blade or vane has a first raised region on the pressure side and a second raised region on the suction side, wherein a highest point of the first raised region is disposed directly adjacent to the pressure side, and a highest point of the second raised region is disposed directly adjacent to the suction side, and
the highest point of the first raised region and the highest point of the second raised region lie in a front or leading one-half of an axial distance in the direction of flow, wherein the axial distance is a projection of a chord, which joins a leading edge region and a trailing edge region of the blade or vane element.

2. The blade or vane according to claim 1, wherein the highest point of the second raised region lies in a front or leading first one-fourth of the axial distance.

3. The blade or vane according to claim 1, wherein the highest point of the first raised region lies in a second one-fourth of the axial distance.

4. The blade or vane according to claim 1, wherein the blade or vane is a rotating blade or a guide vane.

5. The blade or vane according to claim 1, wherein a plurality of rotating blades is disposed next to one another in the peripheral direction and configured and arranged in a rotor having a rotor disk.

6. The blade or vane according to claim 5, wherein the rotating blades are joined to the rotor disk in form-fitting manner by means of their rotating blade root.

7. The blade or vane according to claim 5, wherein the rotating blades and the rotor disk are integrally joined to one another.

8. The blade or vane according to claim 5, wherein at least one rotor is configured and arranged in an aircraft gas turbine.

* * * * *